United States Patent
Chidlovskii (10) Patent No.: US 8,924,313 B2
(45) Date of Patent: Dec. 30, 2014

(54) MULTI-LABEL CLASSIFICATION USING A LEARNED COMBINATION OF BASE CLASSIFIERS

(75) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 804 days.

(21) Appl. No.: 12/793,080

(22) Filed: Jun. 3, 2010

(65) Prior Publication Data

US 2011/0302111 A1 Dec. 8, 2011

(51) Int. Cl.
*G06N 99/00* (2010.01)
(52) U.S. Cl.
CPC ................................. *G06N 99/005* (2013.01)
USPC ............................................................ 706/12
(58) Field of Classification Search
CPC ................................................... G06N 99/005
USPC ............................................................ 706/12
See application file for complete search history.

(56) References Cited

U.S. PATENT DOCUMENTS

| 2007/0198507 A1 | 8/2007 | Brinker et al. |
| 2009/0157572 A1 | 6/2009 | Chidlovskii |

OTHER PUBLICATIONS

Li et al ("Empirical Studies on Multi-label Classification" ICTAI'06).*
Chidlovskii et al ("Scalable Feature Selection for Multi-class Problems" 2008).*
Tang et al ("Large Scale Multi-Label Classification via MetaLabeler" 2009).*
Dietterich, "Machine Learning for Sequential Data: A Review," In T. Caelli, editor, Lecture Notes in Computer Science. Springer-Verlag, 2002.
Yu et al., "Multi-Label Informed Latent Semantic Indexing," In SIGIR '05: Proceedings of the 28th annual international ACM SIGIR conference on Research and development in information retrieval, pp. 258-265, New York, NY, US, 2005 ACM.
Tang et al., "Large Scale Multi-Label Classification via MetaLabeler," In WWW '09: Proceedings of the 18th international conference on World wide web, pp. 211-220, New York, NY, US, 2009. ACM.
Ghamrawi et al., "Collective Multi-Label Classification," In CIKM '05: Proceedings of the 14th ACM international conference on Information and knowledge management, pp. 195-200, New York, NY, US, 2005. ACM.
Tsoumakas et al., "Multi-Label Classification: An Overview," Dept. of Informatics, Aristotle University of Thessaloniki, 54124, Greece (2007).

* cited by examiner

*Primary Examiner* — Lut Wong
(74) *Attorney, Agent, or Firm* — Fay Sharpe LLP (57) ABSTRACT

Multi-label classification is performed by (i) applying a set of trained base classifiers to an object to generate base classifier label prediction sets comprising subsets of a set of labels; (ii) constructing a set of second level features including at least one second level feature defined by a predetermined combination of two or more of the base classifier label prediction sets; and (iii) applying a second level classifier to label the object with a set of one or more labels comprising a subset of the set of labels, labeling being based on the set of second level features. The multi-label classifier is trained by: (iv) applying operations (i) and (ii) to labeled training objects of a set of labeled training objects to generate training metadata comprising sets of second level features for the labeled training objects; and (v) training the second level classifier using the training metadata.

21 Claims, 4 Drawing Sheets

FIG. 4

MULTI-LABEL CLASSIFICATION USING A LEARNED COMBINATION OF BASE CLASSIFIERS

BACKGROUND

The following relates to the multi-label classification arts, document archiving and retrieval arts, database arts, and related arts.

Single-label classification is concerned with learning from a set of examples $x_i \in X$ which are associated with corresponding labels $y_i \in Y$ where Y is a set of k disjoint labels. The special case of k=2 is known as a binary classifier, whereas for k>2 the classifier is termed a multi-class classifier.

For a given input object $x_{IN}$, the output of a single-label classifier is a single label y. A single-label classifier cannot accommodate more complex situations in which an input object $x_{IN}$ may be meaningfully associated with more than one label. In document classification, by way of illustration, a single-label classifier can only assign the document to a single document class, such as "sports" or "politics" or "law". However, it is not uncommon for a document to be meaningfully associated with more than one document class. By way of further example, a document pertaining to legal difficulties of a famous athlete might be meaningfully associated with both "sports" and "law", as well as perhaps some other document class or classes such as "celebrities".

Multi-label classifiers can accommodate such situations. A multi-label classifier assigns for $x_i \in X$ one or more labels selected from a set of labels $Y = \{y_j\}_{j=1,\ldots,k}$ where the various labels $y_j$ are no longer mutually exclusive, that is, a single given object $x_{IN}$ may be assigned two or more of the labels $y_j \in Y$. For example, in one suitable notation $x_i$ is assigned a set $y_i = (y_{i_1}, \ldots, y_{i_j})$ where each element $y_{i_j}$ associates $x_i$ with the i-th label or class of the set of labels Y.

Multi-label classification is more complex than single-label classification. A given input $x_{IN}$ may in general be assigned, one, two, or more classes, and any two classes $y_j$, $y_{j'\neq j} \in Y$ may be wholly independent (i.e., assigning $x_{IN}$ to class $y_j$ has no impact on whether $x_{IN}$ is also assigned to $y_{j'}$); or may be strongly correlated (i.e., assigning $x_{IN}$ to class $y_j$ strongly implies $x_{IN}$ is also assigned to $y_{j'}$) or strongly anti-correlated (i.e., assigning $x_{IN}$ to class $y_j$ strongly implies $x_{IN}$ is not also assigned to $y_{j'}$). The complexity generally increases with the size of the set of labels $Y = \{y_j\}_{j=1,\ldots,k}$ as the possibilities for correlations increases. For example, in a larger set of labels there may be correlations involving three or more labels.

Various techniques for multi-label classification are known.

One-against-all (1AA) techniques transform the problem into k separate binary problems and train k independent single-label binary classifiers $h_i$, each deciding whether to label an input respective to one label of the set of labels $Y = \{y_j\}_{j=1,\ldots,k}$. The outputs of the k single-class classifiers are ranked or thresholded and combined to generate the multi-label result. These techniques are fast and easy to implement, as they decompose the multi-label classification problem into k single-label binary classifications. However, there is a strong assumption of independence among the labels $Y = \{y_j\}_{j=1,\ldots,k}$ imposed by the k single-class classifiers operating independently.

Length-based one-against-all (L-1AA) classification is a modification of the one-against-all approach, which trains additionally a length predictor $h_L$ on the composite input $\{x_i, |y_i|\}$ training set where $|y_i|$ is the numbers of labels in $y_i$. This approach assumes a probabilistic setting for all the binary classifiers $h_i$, in which the binary classifiers first predict length $L_i$ for a given $x_i$, then it is labeled with classes $y_i$ having the top $L_i$ scores. This modification can improve performance, and is scalable. However, the performance is sensitive to the performance of the length predictor $h_L$, and retains the assumption of independence of the classes that is made in the one-against-all approach.

Unique multi-class (UMC) multi-label classification approaches take each label set $y_i$ present in the training set $T = \{x_i, y_i\}$ as a unique label, and performs single-label classification using this set of composite labels. The approach is in principle easy to implement, since it employs one single-class classifier. However, the number of disjoint composite labels for this single-class classifier can be very large, since it equals the number of unique label combinations $y_i$ in the training set T. By way of example, even for a small value of k=4 for the set of labels $Y = \{1,2,3,4\}$, the number of composite labels can be as high as 15. The training set T may have few (or even no) example of some possible composite labels, and there is no way to generalize to encompass any composite labels that are not included in the training set. This technique also assumes independence of the labels of the set of labels Y.

Collective multi-label (CML) classification is intended to address situations in which the set of labels Y include correlated labels. It utilizes multi-label conditional random field (CRF) classification models that directly parameterize label co-occurrences. This approach performs well on small datasets, but the learning and inference is complex and is not scalable.

Latent variables in Y (Latent-Y) classification techniques discover relevant groups or "topics" among the set of labels Y and replaces discovered groups with single "topic" labels. This approach also can accommodate correlations. Most techniques require a priori knowledge or selection of the number of topics, and informational loss can be incurred when decoding from topics to labels to generate the final multi-label assignments. Latent variables in (x, y) (Latent-X-Y) techniques are an extension aimed at discovering topics in the (X,Y) space, using a multi-label informed latent semantic indexing (MLSI) algorithm which preserves the information of inputs and captures correlations between multiple outputs. The recovered "latent semantics" thus incorporate the annotated category information and can be used to improve the prediction accuracy. However, implementation is difficult, and scalability is limited.

The various multi-label classification techniques each have advantages and disadvantages, which flow from various assumptions made in the various techniques. For example, techniques such as the one-against-all that make an independence assumption are fast to implement because the multi-label classification is reduced (or at least partially reduced) to a set of single-class classification problems. However, these techniques can be expected to perform poorly in the presence of correlations or anti-correlations between labels. On the other hand, techniques such as CML or latent-Y techniques are designed to accommodate correlations between labels, but at the expense of higher complexity and possible information loss (e.g., when a sub-set of labels is replaced by a single "topic" label).

The following discloses methods and apparatuses for system monitoring and other time series processing which accommodate delayed disclosure.

BRIEF DESCRIPTION

In some illustrative embodiments disclosed as illustrative examples herein, a method comprises performing multi-label classification of an object respective to a set of labels by operations including: (i) applying a set of trained base classifiers to the object to generate base classifier label prediction sets comprising subsets of the set of labels; and (ii) applying a second level multi-label classifier that receives input data comprising the base classifier label prediction sets and based on the input data generates as output a set of one or more labels comprising a subset of the set of labels. The multi-label classification is suitably performed by a digital processing device.

In some illustrative embodiments disclosed as illustrative examples herein, in the method of the immediately preceding paragraph the operation (ii) comprises: (ii)(a) generating a set of second level features each comprising a predetermined combination of one or more of the base classifier label prediction sets; and (ii)(b) generating the output based on the set of second level features.

In some illustrative embodiments disclosed as illustrative examples herein, the method of the immediately preceding paragraph further comprises training the second level multi-label classifier by a method including: (1) applying the set of trained base classifiers to a set of labeled training objects to generate base classifier label prediction sets comprising subsets of the set of labels for the training objects; (2) generating for each training object metadata comprising the set of second level features each comprising a predetermined combination of one or more of the base classifier label prediction sets; and (3) training the second level multi label classifier based on the generated metadata. The training is suitably performed by a digital processing device.

In some illustrative embodiments disclosed as illustrative examples herein, a storage medium stores instructions executable by a digital processing device to perform a method comprising performing multi-label classification of an object respective to a set of labels by operations including: (i) applying a set of trained base classifiers to the object to generate base classifier label prediction sets comprising subsets of the set of labels; (ii) constructing a set of second level features selected from a group consisting of subgroup (I) consisting of the base classifier label prediction sets and subgroup (II) consisting of one or more predetermined combinations of two or more of the base classifier label prediction sets, wherein at least one of the generated second level features is selected from subgroup (II); and (iii) labeling the object with a set of one or more labels comprising a subset of the set of labels, the labeling being based on the generated set of second level features.

In some illustrative embodiments disclosed as illustrative examples herein, in a storage medium as set forth in the immediately preceding paragraph the method further comprises: (iv) applying operations (i) and (ii) to labeled training objects of a set of labeled training objects to generate training metadata comprising sets of second level features for the labeled training objects; and (v) training a second level classifier to perform the labeling operation (iii) using the training metadata.

In some illustrative embodiments disclosed as illustrative examples herein, an apparatus comprises a multi-label classifier for classifying an object respective to a set of labels by: (i) applying a set of trained base classifiers to the object to generate base classifier label prediction sets comprising subsets of the set of labels; (ii) constructing a set of second level features including at least one second level feature defined by a predetermined combination of two or more of the base classifier label prediction sets; and (iii) applying a second level classifier to label the object with a set of one or more labels comprising a subset of the set of labels, the second level classifier performing the labeling based on the set of second level features. The multi-label classifier is suitably embodied by a digital processing device.

In some illustrative embodiments disclosed as illustrative examples herein, an apparatus as set forth in the immediately preceding paragraph further comprises a trainer for training the multi-label classifier by: (iv) applying operations (i) and (ii) to labeled training objects of a set of labeled training objects to generate training metadata comprising sets of second level features for the labeled training objects; and (v) training the second level classifier using the training metadata. The trainer is also suitably embodied by the digital processing device.

DETAILED DESCRIPTION

It is recognized herein that one difficulty in constructing effective multi-label classifiers is that the classifier should be broadly applicable across the set of labels. Achieving this is difficult. For example, some portion of the labels may be uncorrelated, and hence would be best accommodated by a technique such as one-against-all that employs an independence assumption. On the other hand, some portion of the labels may be correlated (which, as used henceforth herein, also encompasses anti-correlations), and would best be accommodated by a technique such as CML or latent Y that is designed to account for correlations. It is recognized herein that no single multi-label classifier is likely to effectively accommodate labeling respective to labels and label combinations spanning the spectrum from independent to strongly correlated.

It is further recognized herein that a multi-label classification system may evolve over time by the addition of new labels. Thus, it would be useful to add new classifier capability accommodating new classes, without discarding previous classifiers designed for a more limited set of classes that nonetheless have been proven useful within their designated scope of classes.

The multi-label classification approaches disclosed herein employs a stacking principle to combine the predictions of a set of base classifiers to generate the final labeling for an input object. This approach beneficially combines complementary base classifiers, such as a one-against all classifier that employs an independence assumption and a technique such as CML or latent Y that is designed to account for correlations. The disclosed approaches for combining base classifier outputs make no assumption regarding correlations or lack thereof between the various labels or groups of labels in the multi-label space, or between input objects or groups of input objects. The disclosed approaches implement discovery routines that identify recompositions of the base classifiers that reduce the multi-label classification entropy.

To enable the assembly classifier, that is, the recomposition of the base classifiers, to be learned in an automated fashion, in some disclosed approaches the outputs of the base classifiers are processed to extract second level features comprising base classifier label sets and/or one or more combinations of base classifier label sets. These second level features form metadata that serves as input to a second level (i.e., assembly) classifier. By training the second level classifier, the discovery process is implemented and the trained second level classifier embodies an optimized recomposition of the base classifiers. In some embodiments, the base classifiers and the second level (assembly) classifier are trained using the same training set. In some embodiments, cross-validation is used in this training for improved robustness.

Figure 1:
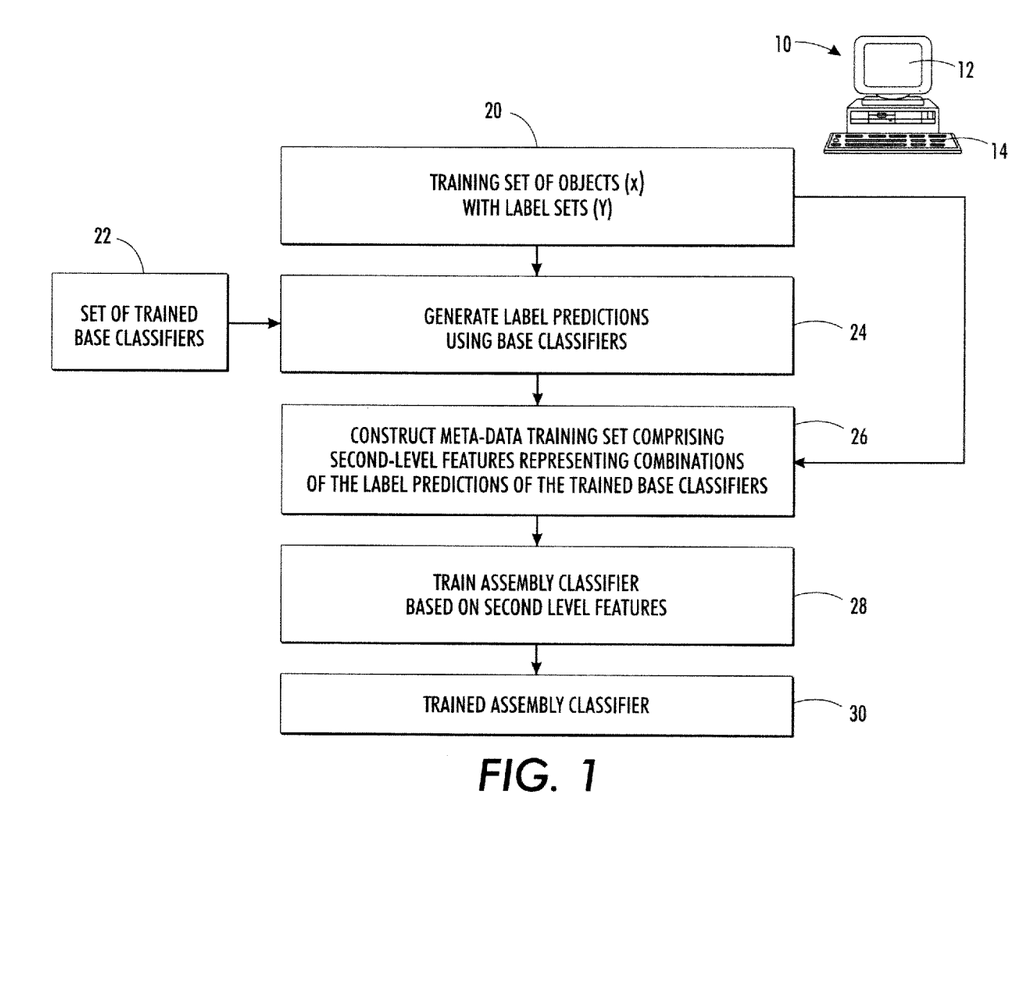
FIG. 1 diagrammatically shows the training phase of a multi-label classification system.
Figure 2:
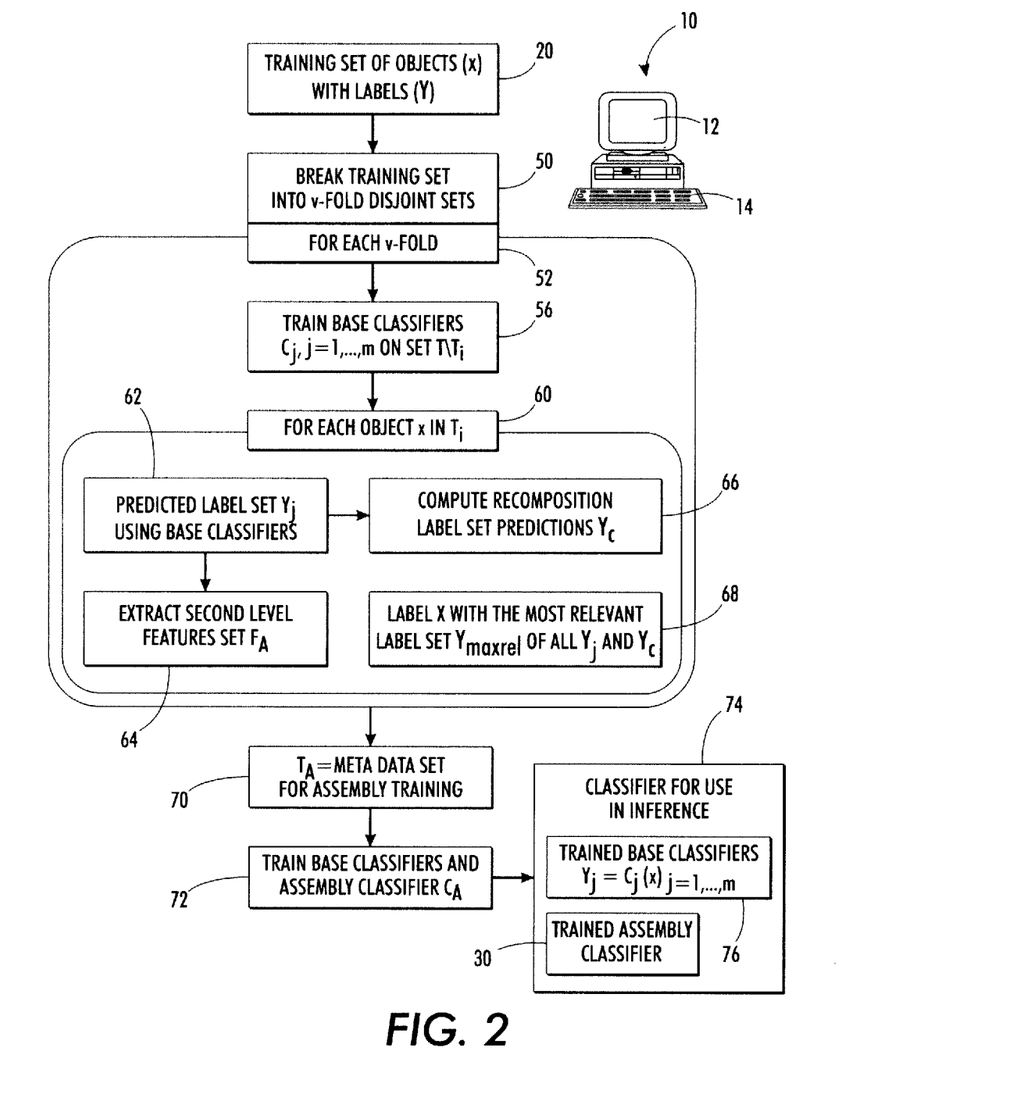
FIGS. 2 and 3 diagrammatically show the training phase and the inference phase, respectively, of a multi-label classification system employing cross-validation.
Figure 3:
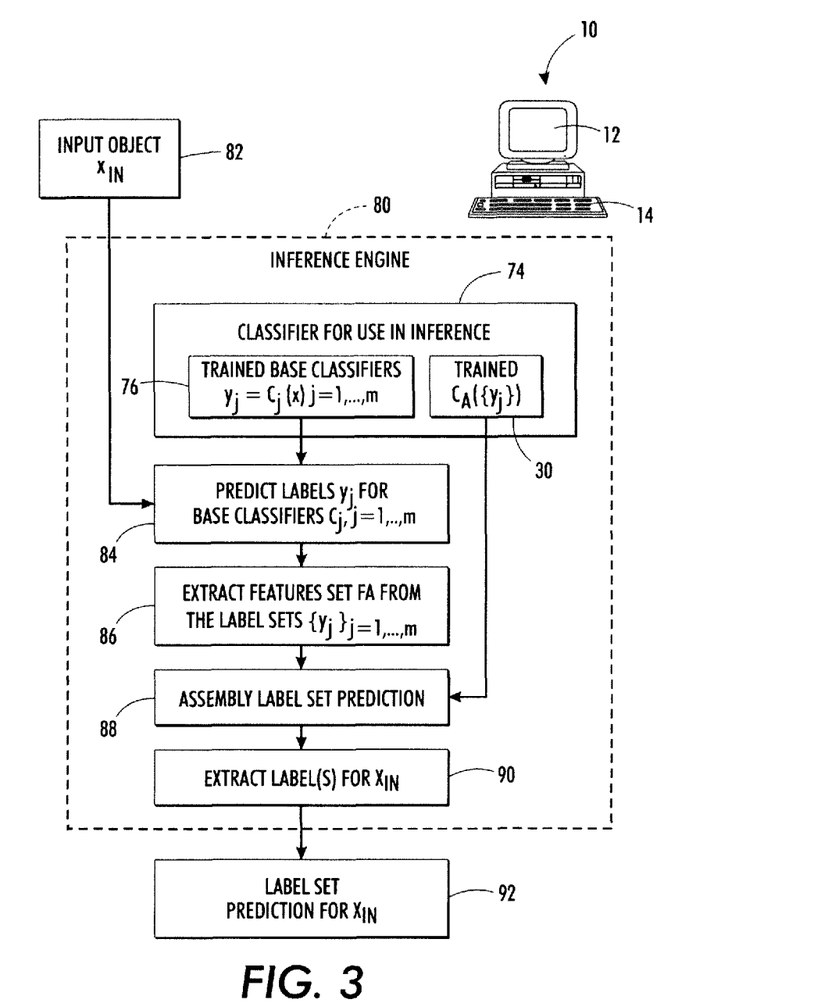

With reference to FIGS. 1-3, illustrative multi-label classification systems include a training phase (FIGS. 1 and 2 illustrate two trainer embodiments) and an inference phase (FIG. 3 illustrates an inference engine embodiment employing a multi-label assembly classifier trained using the trainer of FIG. 2). As diagrammatically shown, the illustrative multi-label classification systems are suitably embodied by an illustrative computer 10, or by another digital processing device such as a network server, that includes a digital processor (not illustrated) such as one or more microprocessors (which may be single core, dual core, or other multi-core processors), one or more microcontrollers, one or more graphical processing units (GPU's), or various combinations thereof. The digital processing device 10 may further include other components such as random access memory (RAM), read-only memory (ROM), or other memory element(s), and further may further include other auxiliary components such as suitable electronic circuitry for power delivery, digital communications, data access and storage, auxiliary digital logic, and so forth. The illustrative computer embodiment of the digital processing device 10 also includes an illustrative computer display 12, and an illustrative computer keyboard 14. Other user input and/or output devices may be provides, such as a mouse or other pointing device, a printer, or so forth. The output of the multi-label classification system may also be used in other ways, such as to index the object in a database.

The illustrative multi-label classification systems are suitably embodied by an illustrative computer or other digital processing device 10. Toward this end, it is also to be appreciated that the illustrative multi-label classification systems may be suitably embodied by a storage medium storing instructions executable by the digital processing device 10 to perform disclosed illustrative multi-label classification methods. The storage medium may, for example, be a hard disk component of the illustrative computer 10 (detail not illustrated), or an optical disk that is read by a suitable optical disk reader, or an electronic storage medium such as a FLASH memory, random access memory (RAM), or so forth.

The training component of the multi-label classification system trains the multi-label classifier using a set of labeled training objects, and the trained multi-label classifier is applied to unlabeled objects to generate one or more labels for the object. Toward this end, training data and/or objects to be labeled may be stored on digital data storage of the digital processing device 10 (for example, on an internal hard drive, inserted optical disk, or other storage medium of the illustrative computer 10), or may be received via the Internet, a local area network (LAN), or other digital network (not shown).

The term "object" as used herein encompasses any object, represented as electronic data, that is to be classified. For example, an object may be a document (for example, a word processing document, a spreadsheet, a presentation, or so forth), an image, an audio file or other unit of audio content, a video file or other unit of video (or audiovideo) content, or so forth The object is represented as electronic data, for example in the form of an abstracted data set. By way of illustrative example, a text-based document may be represented by a "bag of words" representation comprising a vector whose elements contain word counts in the document for key words corresponding to the vector elements. By way of another illustrative example, an image or video clip may be represented by a features vector whose elements store statistical information about the image or video clip or portions thereof (e.g., image key patches, video frames, or so forth). An audio clip object may similarly be represented by amplitude and phase components of selected sound frequencies. Although a vector representation is referred to herein, the electronic data representing an object can take various formats, such as a vector, array, matrix, set of elements, or so forth.

Figure 4:
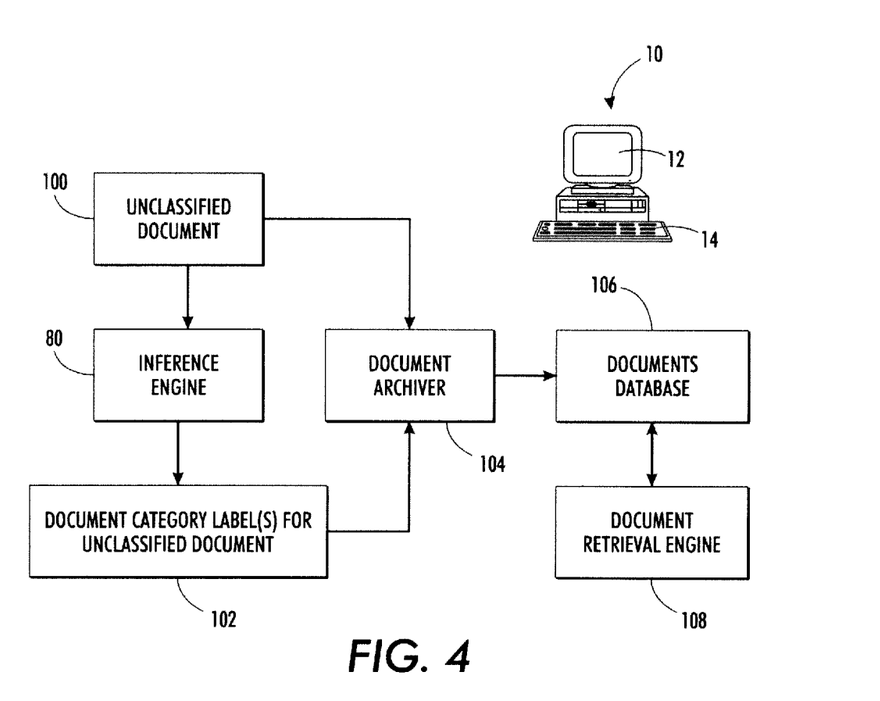
FIG. 4 diagrammatically shows a document archiving and retrieval system employing the inference engine of FIG. 3.

The labels generated for an input object by the inference phase may be used in various ways, dependent on the type of object and the set of labels of which the generated labels are a subset. FIG. 4 illustrates one illustrative application, namely a document archiving and retrieval system, in which the object is a document and the labels are document category labels that are used in archiving and retrieving the document.

With reference to FIG. 1, an illustrative trainer of a multi-label classification system trains a multi-label classifier using a set of labeled training objects 20. Each training object is represented by a representation x, and the corresponding object label is represented as y. The object representation x may, for example, be a bag-of-words document representation, a features vector image representation, or so forth. The object label y is assumed to be correct, i.e., y is the true set of labels for the corresponding object x. As multi-label classification is under consideration, it is to be understood that the label y in general represents set of one or more labels each selected from a set of k labels $Y=\{y_i\}_{i=1,\ldots,k}$. It is contemplated for the label set y to include as few as a single label for a given object. The training set 20 is suitably representative of labeling of objects with the set of labels Y. Accordingly, the label sets y for the set of training objects 20 should include a representative number of occurrences of each label $Y_i$, i=1, ..., k.

In the illustrative trainer of FIG. 1, it is assumed that there exists a set of trained base classifiers 22. Each of the base classifiers may in general be a single-label classifier or a multi-label classifier; however, it is assumed that at least one of the trained base classifiers 22 is a multi-label classifier, and in some embodiments all of the trained base classifiers 22 are multi-label classifiers. The trained base classifiers 22 may, for example, include a plurality of multi-label classifiers each selected from the group consisting of: a one against all (1AA) classifier; a length-based one-against-all (L-1AA) classifier; a unique multi-class (UMC) classifier; a collective multi-label (CML) classifier; a latent variables in Y (Latent Y) classifier; or a latent variables in (X,Y) (Latent X-Y) classifier.

The set of trained base classifiers 22 span the set of labels $Y=\{Y_i\}_{i=1,\ldots,k}$. Said another way, for each label $Y_i \epsilon Y$ at least one base classifier of the set of base classifiers 22 has the ability to predict that label $Y_i$ for an input object. However, a given base classifier of the set of trained base classifiers 22 is not necessarily capable of outputting all labels $y_i \epsilon Y$. By way of illustrative example, if Y={1,2,3,4,5}, then a possibility for the set of trained classifiers 22 could consist of: multi-label classifier $C_1$ which outputs y∈{{3}, {4}, {5}, {3,4}, {3,5}, {4,5}, {3,4,5}}; multi-label classifier $C_2$ which outputs y∈{{1},{2}, {3}, {1,2}, {1,3}, {2,3}, {1,2,3}}; and a single-label classifier $C_3$ which outputs y∈{{1},{2},{3},{4},{5}}.

In an operation 24, label predictions are generated for the objects of the training set 20 using the base classifiers 22. Without loss of generality, the number of base classifiers 22 is denoted m, and the base classifiers are denoted $C_j$, j=1, ..., m. The set of zero, one, two, or more labels generated by the $j^{th}$ classifier $C_j$ for an object x is denoted herein as $\tilde{y}_j$. Thus, in the operation 24 the m classifiers $C_j$, j=1, . . . , m generate corresponding outputs in the form of predicted label sets $\tilde{y}_j$, j=1, . . . , m for each training object of the set of training objects 20.

The trainer of FIG. 1 performs automated learning to generate an assembly classifier comprising a recomposition of two or more of the base classifiers 22. Toward this end, an operation 26 constructs a metadata training set comprising second level features representing combinations of the label predictions $\tilde{y}_j$ of the trained base classifiers $C_j$, j=1, . . . , m 22. The base classifier predictions $\tilde{y}_j$, j=1, . . . , m are assumed herein to be deterministic predictions; however, the automated learning of the assembly classifier is readily extended to base classifiers that generate probabilistic label predictions. In general, recompositions of the trained base classifiers $C_j$, j=1, . . . , m 22 can employ any recomposition function operating on pairs, triples, or other combinations of the base classifier predictions; however, by way of illustrative example herein only recomposition functions operating on pairs of base classifier predictions are considered. Considering a pair of base classifier predictions denoted $\tilde{y}_j$ and $\tilde{y}_{j'\neq j}$, the recomposition $y_c$ is denoted $y_c = r(\tilde{y}_j, \tilde{y}_{j'\neq j})$. The recomposition function r can employ substantially any predetermined combination of the two (or in general, three, or more) base classifier label prediction sets $\tilde{y}_j$ and $\tilde{y}_{j'\neq j}$. For example, the illustrative recomposition $y_c = r(\tilde{y}_j, \tilde{y}_{j'\neq j})$ can be constructed using one or more set operators selected from the group of set operators consisting of union (that is, $r(\tilde{y}_j, \tilde{y}_{j'\neq j}) = \tilde{y}_j \cup \tilde{y}_{j'\neq j}$), intersection (that is, $r(\tilde{y}_j, \tilde{y}_{j'\neq j}) = \tilde{y}_j \cap \tilde{y}_{j'\neq j}$), difference, joint difference, and negation, or so forth.

A recomposition $y_c = r(\tilde{y}_j, \tilde{y}_{j'\neq j})$ is useful if it is more relevant, that is, more predictive of the true label set y of the training set 20, than the constituent classifier predictions $\tilde{y}_j$, $\tilde{y}_{j'\neq j}$. Given $\tilde{y}_j$, j=1, . . . , m, a recomposition candidate $y_c = r(\tilde{y}_j, \tilde{y}_{j'\neq j})$ is defined herein as "sound" if $y_c$ is more relevant to (that is, closer to) the true label set y than any $\tilde{y}_j$, j=1, . . . , m. We measure the relevance or closeness of a candidate recomposition $y_c$ by a suitable distance or similarity metric such as the Hamming distance, Hamming($y_c$,y) or a size-biased version of the Hamming distance suitably denoted Rel($y_c$,y)=$|y_c \cap y|/|y|+|y_c|$.

By way of illustrative example, for a given x with the true y={1,2,3}, assume three base classifiers $C_1$, $C_2$, and $C_3$ yield respective label set predictions $\tilde{y}_1$={1}, $\tilde{y}_2$={2,4}, and $\tilde{y}_3$={3,4,5}. Then a recomposed candidate $y_c$=merge($\tilde{y}_1$, $\tilde{y}_2$)={1,2,4} is sound. According to either the Hamming distance measure or the size-biased Rel distance measure.

With continuing reference to FIG. 1, the output of the operation 26 is a set of second level features that represent various candidate recompositions. In an operation 28, an assembly classifier is trained on the second level features to generate a trained assembly classifier 30, denoted herein as the trained assembly classifier $C_A$. The training set includes the training objects x and corresponding true labels y, augmented by the second level features. The second level features suitably include the label set predictions $\tilde{y}_j$, j=1, . . . , m and one or more recompositions of the form $y_c = r(\tilde{y}_j, \tilde{y}_{j'\neq j})$. For the assembly step, all sound candidates can be used, or alternatively a top-k most relevant candidates can be used. The assembly volume is considered to be the portion of training data 20 where assembly candidates $y_c = r(\tilde{y}_j, \tilde{y}_{j'\neq j})$ are more relevant than the base predictions $\tilde{y}_j$, j=1, . . . , m.

The set of candidate recompositions R={r( . . . )} is a design parameter for the assembly classifier trainer 28. To allow the assembly classifier to be learned, the set of candidate recompositions is suitably represented as second level features $F_A(\{\tilde{y}_j\}$, j=1, . . . , m). In some suitable embodiments, the set of second level features $F_A$ are suitably of three types: (1) features of type $f_A^1$ for a given prediction $\tilde{y}_i$, like the score difference between the top and 2-top class in the 1AA and length-1AA classifiers; (2) features of type $f_A^2$ for a pair of predictions $\tilde{y}_i$, $\tilde{y}_j$, like the size of overlap of the L-1AA and UMC predictions; and (3) features of type $f_A^0$ for any class $y_i \epsilon Y$ like its prior or the coocurrence with another $y_j$. Optionally, of these assembly features only those yielding non-zero information gain (or the relative entropy) are retained as metadata for the assembly classifier training. Once the assembly candidate $\{y_c\}$ and features set $F_A(\{\tilde{y}_j\}$ j=1, . . . , m) are defined, the assembly classifier is trained on all x, extended with $F_A(\{\tilde{y}_j\}$, j=1, . . . , m). The "true" class label used for the assembly classifier training can be the label y associated with x in the training set 20, or alternatively can be the most relevant label prediction of the group $\{\{\tilde{y}_j\}$, j=1, . . . , m, $\{y_c\}\}$, that is, the most relevant label prediction set of either the base prediction sets $\tilde{y}_j$ or the recomposition prediction sets $y_c$.

In the embodiment of FIG. 1, the availability of the set of trained base classifiers 22 is assumed.

With reference to FIG. 2, another trainer embodiment is disclosed. In the embodiment of FIG. 2, the base classifiers are assumed to be not trained, and the training set 20 is used to train both the base classifiers and the assembly classifier. The trainer embodiment of FIG. 2 employs Algorithm 1 having pseudocode as listed below:

---

Algorithm 1:

---

Input:
    training dataset T
    base multilabel classifiers $C_i$ , i = 1,...,m
    recomposition function set R
Output: Assembly classifier $C_A$
1:    Split T into v disjoint subsets $T_1$ ,..., $T_v$
2:    Set meta-level training set $T_A$ = { }
3:    for i = 1 to v do
4:        Train each classifier $C_j$ , j = 1,...,m on T \ $T_i$
5:        for all x ∈ $T_i$ do
6:            Predict label sets $\tilde{y}_j$ for all $C_j$ , j = 1,...,m
7:            Use functions from R on $\tilde{y}_j$ to compose candidates $y_c$
8:            Select the most relevant label set, encode it $\hat{y}$
9:            Extract features set $F_A(\{\tilde{y}_j\})$
10:          Add ( $x_i \cup F_A\{\tilde{y}_j\}$) with label $\hat{y}$ to $T_A$
11:       end for
12:    end for
13: Optionally select top k candidates using information gain criterion
14: Train assembly classifier $C_A$ using $T_A$

---

The stacking principle (see, e.g., Chidlovskii, U.S. Pub. No. 2009/0157572 A1 which is incorporated herein by reference in its entirety) is employed to combine multiple classifiers by learning a meta classifier that predicts the correct label set based on the decisions of the base classifiers. The model is induced on a set of meta-level training data that are suitably produced by applying a procedure similar to v-fold cross-validation. Toward this end, the training data set 20 is divided in an operation 50 into v-fold disjoint training sets $T_i$, i=1, . . . , v (corresponding to Algorithm 1 step 1), and processing to generate the metadata are performed using cross-validation for each v-fold 52 (corresponding to the content of the for . . . end for loop of Algorithm 1 steps 3-12). The v-folds are suitably of equal size, although folds of unequal size are also contemplated. For each fold 52 i=1, . . . , v of the process, the base classifiers $C_j$, j=1, . . . , m are trained on the set $T\backslash T_i$ in an operation 56 (corresponding to Algorithm 1 step 4) and then applied to each object x test set $T_i$ in block 60 (corresponding to the content of the for . . . end for loop of Algorithm 1 steps 5-11). In the notation $T\backslash T_i$, the backslash operator "\" denotes the relative complement or set difference operator, and the set $T\backslash T_i$ constitutes all training data in the training data set 20 except for the training data in the subset $T_i$. In other words, the base classifiers are trained in the operation 56 on the set $T\backslash T_i$ and are applied (i.e., validated) on the remaining data (sub-) set $T_i$. In the block 60, the trained classifiers $C_j$, j=1, . . . , m are applied to generate label set predictions $\tilde{y}_j$, j=1, . . . , m 62. This corresponds to Algorithm 1 step 6. In an operation 64, the second level features $F_A(\{\tilde{y}_j\}, j=1, \ldots, m)$ are generated from the label set predictions $\tilde{y}_j$ of the base classifiers $C_j$. This corresponds to Algorithm 1 step 9.

The outputs $\tilde{y}_j$ of the classifiers $C_j$ for a test instance $x_i \in T_i$ along with a true label set of that instance form a metadata training set element. In some embodiments, the true label set for $x_i$ is suitably the label $y_i$ assigned in the initial training set 20. Alternatively, as shown in FIG. 2 and Algorithm 1, the true label set for $x_i$ is suitably the most relevant base or recomposed label set prediction. Toward this end, an operation 66 (corresponding to Algorithm 1 step 7) computes the recomposition label set predictions $y_c$ by applying the recomposition functions of the recomposition functions set R to the base classifier label set predictions $\tilde{y}_j$, and an operation 68 (corresponding to Algorithm 1 step 8) selects the "true" label $\hat{y}$ for $x_i$ as the most relevant of the base predictions $\tilde{y}_j$ and recomposed predictions $y_c$, as measured by the Hamming distance, Rel distance, or other suitable relevance metric.

Metadata 70 for the assembly classifier training are denoted herein as $T_A$. The metadata are optionally filtered based on soundness of the recomposition, information gain (or the relative entropy), or other criteria. In some embodiments, all sound recomposition candidates are retained. In other embodiments, only the top-k most relevant recomposition candidates are retained (see Algorithm 1 optional step 13). In an operation 72 (corresponding to Algorithm 1 step 14) the assembly classifier is trained on the metadata 70 and the base classifiers are trained on the original set of training data 20. (Note, by comparison, that during earlier operation 56 the base classifiers were trained on the reduced data set $T\backslash T_i$). Accordingly, the output of the operation 72 is a classifier 74 for use in inference, which includes both the trained base classifiers 76 and the trained assembly classifier $C_A$ 30.

With reference to FIG. 3, an inference engine 80 employing the classifier 74 generated by the trainer of FIG. 2 is diagrammatically illustrated. The inference engine 80 employs Algorithm 2 having pseudocode as listed below:

---
Algorithm 2:
---
Input:
 New instance $x_{IN}$
 Trained base classifiers $C_j$, j = 1,...,m
 Trained assembly classifier $C_A$
Output:
 Label set prediction for $x_{IN}$
1. Predict label sets $\tilde{y}_j = C_j(x_{IN})$, j = 1,...,m
2. Extract features set $F_A(\{\tilde{y}_j\}$, j = 1,...,m)
3. Predict $\hat{y}$ using $C_A$ operating on ($x_{IN} \cup F_A(\{\tilde{y}_j\}$, j = 1,...,m)
4. Decode $\hat{y}$ and return label set prediction for $x_{IN}$
---

When a new instance $x_{IN}$ 82 arrives for classification, the predictions by the trained base classifiers 76 are first calculated in an operation 84 (corresponding to Algorithm 2 step 1) and then propagated to the meta classifier by computation of the second level features set $F_A(\{\tilde{y}\}$, j=1, . . . , m) in an operation 86 (corresponding to Algorithm 2 step 2). The resulting metadata are input to the assembly classifier $C_A$ 30, which outputs the label set prediction $\hat{y}$ 88 (corresponding to Algorithm 2 step 3). However, because the assembly classifier $C_A$ 30 operates in the extended space including the second level features $F_A$, the prediction $\hat{y}$ 88 may include labels which do not directly correspond with elements of the set of labels Y, but rather are recompositions of such labels as defined by second level features $F_A$. Accordingly, in an extraction or decode operation 90 (corresponding to Algorithm 2 step 4) the prediction $\hat{y}$ 88 is treated as an intermediate result that is decoded to recover the constituent labels of the set of labels Y so as to generate the label set prediction 92 for the input object $x_{IN}$ 82.

With reference to FIG. 4, an illustrative application of the inference engine 80 is shown. The application is document archiving and retrieval, and is suitably implemented by the illustrative computer 10. In this application, an unclassified document 100, suitably represented by a bag-of-words representation or other electronic data representation, serves as the input object $x_{IN}$ that is classified by the inference engine 80. The label set prediction output (corresponding to element 92 in FIG. 3) is a document category label or labels 102 for the unclassified document 100. A document archiver 104 adds the (now classified) document 100 to a documents database 106, using the document category label or labels 102 to index or otherwise organize the document 100 in the documents database 106. A human user (or, in other embodiments, an automated user such as another automated application) may then retrieve the document 100 via a document retrieval engine 108. For example, the document retrieval engine 108 may include a graphical user interface (GUI) implemented by the computer 10 with the display device 12 showing the GUI display, and the user may locate the document 100, for example using a search limited to user-selected document categories including one or more of the document category label or labels 102 of the document 100.

The document archiving and retrieval application of FIG. 4 is an illustrative example. By way of further illustrative example, the disclosed classification techniques may be employed in audio, video, and/or audiovideo archiving and retrieval, in screening applications in which the disclosed classification techniques are used to screen incoming objects (e.g., newspaper articles, visa request forms, or so forth) to classify the objects as to whether they merit further investigation or review by human personnel, or so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
 performing multi-label classification of an object respective to a set of labels by operations including:
  (i) applying a set of trained base classifiers to the object to generate base classifier label prediction sets comprising subsets of the set of labels wherein at least two base classifiers of the set of trained base classifiers are multi-label classifiers;
  (ii) generating a set of second level features each comprising a predetermined combination of one or more of the base classifier label prediction sets wherein at least two second level features of the set of second level features each comprise a predetermined combination of two or more of the base classifier label prediction sets constructed using one or more set operators;

(iii) applying a second-level multi-label classifier that receives input data comprising the set of second level features and based on the input data generates as output a set of one or more labels comprising a subset of the set of labels;

wherein the multi-label classification is performed by a digital processing device.

2. The method as set forth in claim 1, further comprising:
training the second level multi-label classifier by a method including:
(1) applying the set of trained base classifiers to a set of labeled training objects to generate base classifier label prediction sets comprising subsets of the set of labels for the training objects;
(2) generating for each training object metadata comprising the set of second level features; and
(3) training the second level multi-label classifier based on the generated metadata;
wherein the training is performed by a digital processing device.

3. The method as set forth in claim 2, wherein the training further comprises:
(4) training the set of trained base classifiers using the set of labeled training objects.

4. The method as set forth in claim 2, wherein the training further comprises:
(0) partitioning the set of labeled training objects into v training subsets, the training employing v-fold cross-validation in which for the $v^{th}$ fold the operations (1) and (2) include:
(1)(a) training the set of trained base classifiers using all training subsets except a $v^{th}$ one of the training subsets;
(1)(b) applying the set of trained base classifiers that are trained in the operation (1)(a) to the $v^{th}$ one of the training subsets to generate the base classifier label prediction sets comprising subsets of the set of labels for the training objects; and
(2) generating for each training object in the $v^{th}$ one of the training subsets metadata comprising the set of second level features each comprising a predetermined combination of one or more of the base classifier label prediction sets.

5. The method as set forth in claim 2, wherein the operation (3) comprises:
(3)(a) training the set of trained base classifiers using the complete set of labeled training objects; and
(3)(b) training of the second level multi-label classifier based on the generated metadata using the trained base classifiers trained in the operation (3)(a).

6. The method as set forth in claim 1, wherein said set operators are selected from the group of set operators consisting of union, intersection, difference, joint difference, and negation.

7. The method as set forth in claim 6, wherein at least one second level feature of the set of second level features identically comprises one of the base classifier label prediction sets.

8. The method as set forth in claim 1, wherein the object is a document and the set of labels are a set of document category labels, the method further comprising:
archiving the document in a documents database with the document categorized by the set of one or more document category labels output by the operation (iii) of the multi-label classification performed on the document;
wherein the archiving is performed by a digital processing device.

9. A non-transitory storage medium storing instructions executable by a digital processing device to perform a method comprising:
performing multi-label classification of an object respective to a set of labels by operations including:
(i) applying a set of at least four trained base classifiers to the object to generate base classifier label prediction sets comprising subsets of the set of labels wherein each of the base classifiers of the set of four or more trained base classifiers is a multi-label classifier;
(ii) constructing a set of second level features wherein each second level feature is one of the base multi-label classifier label prediction sets or a negation of one of the base classifier label prediction sets or a recomposition function operating on two or three of the base classifier label prediction sets, and wherein at least two of the generated second level features are recompositions wherein each recomposition is constructed by applying one or more set operators to combine two or three of the at least four base classifier label prediction sets; and
(iii) labeling the object with a set of one or more labels comprising a subset of the set of labels, the labeling being based on the generated set of second level features.

10. The non-transitory storage medium as set forth in claim 9, wherein the method further comprises:
(iv) applying operations (i) and (ii) to labeled training objects of a set of labeled training objects to generate training metadata comprising sets of second level features for the labeled training objects; and
(v) training a second level classifier to perform the labeling operation (iii) using the training metadata.

11. The non-transitory storage medium as set forth in claim 10, wherein the method further comprises:
(vi) partitioning the set of labeled training objects into a plurality of training subsets, the operation (iv) including training the base classifiers and using the plurality of training subsets to perform cross-validation.

12. The non-transitory storage medium as set forth in claim 11, wherein the operation (v) comprises:
(v)(a) training the set of trained base classifiers using the complete set of labeled training objects; and
(v)(b) training of the second level multi-label classifier based on the generated metadata using the trained base classifiers trained in the operation (v)(a).

13. The non-transitory storage medium as set forth in claim 10, wherein the operation (v) uses only a portion of the training metadata, said portion comprising a most relevant subset of the set of second level features wherein relevance is measured respective to the labels of the set of labeled training objects.

14. The non-transitory storage medium as set forth in claim 9, wherein each recomposition function comprises one or more set operators selected from the group of set operators consisting of union, intersection, difference, joint difference, and negation.

15. An apparatus comprising:
a multi-label classifier for classifying an object respective to a set of labels by:
(i) applying a set of trained base classifiers to the object to generate base classifier label prediction sets comprising subsets of the set of labels;

(ii) constructing a set of second level features including a plurality of second level features defined by different recompositions wherein each recomposition comprises a label prediction set generated by a recomposition function operating on two or more of the base classifier label prediction sets; and (iii) applying a second level classifier to label the object with a set of one or more labels comprising a subset of the set of labels, the second level classifier performing the labeling based on the set of second level features;

a trainer for training the multi-label classifier by:

(iv) applying operations (i) and (ii) to labeled training objects of a set of labeled training objects to generate training metadata comprising sets of second level features for the labeled training objects;

(v) discarding any second level feature comprising a recomposition that is less close to the label sets of the labeled training objects than one of the base classifier label prediction sets; and (vi) training the second level classifier using training metadata remaining after the discarding (v);

wherein the multi-label classifier and the trainer are embodied by a digital processing device.

16. The apparatus as set forth in claim 15, wherein the operation (vi) further includes training the base classifiers of the multi-label classifier using the set of labeled training objects prior to training the second level classifier.

17. The apparatus as set forth in claim 15, wherein the operation (iv) further includes training the base classifiers using at least a subset of the set of labeled training objects prior to applying the operation (i) to the labeled training objects to generate the training metadata.

18. The apparatus as set forth in claim 17, wherein the trainer employs cross-validation in performing the operation (iv).

19. The apparatus as set forth in claim 15, wherein each recomposition function comprises one or more set operators selected from a group consisting of union, intersection, difference, joint difference, and negation.

20. The apparatus medium as set forth in claim 15, wherein each of the base classifiers of the set of trained base classifiers is a multi-label classifier.

21. The apparatus medium as set forth in claim 15, wherein the set of second level features includes at least one second level feature defined by only one of the base classifier label prediction sets.

* * * * *